Dec. 12, 1967   R. H. APPELDORN ETAL   3,357,775
PROJECTION OBJECTIVE AFFORDING VARIABLE MAGNIFICATION
Original Filed Nov. 13, 1961   3 Sheets-Sheet 1

| EFL=358. MM. | | | | f/5.2 |
|---|---|---|---|---|
| LENS | $N_D$ | V | RADII MM. | THICKNESSES & AIRSPACES MM. |
| 1 | 1.6203 | 60.3 | $R_1$=+165.25 | $t_1$ = 9.5 |
| | | | $R_2$=−1166. | $S_1$ = 5.6 |
| 2 | 1.5170 | 64.5 | $R_3$= ∞ | $t_2$ = 63.5 |
| | | | $R_4$= ∞ | $S_2$= 10.0 |
| 3 | 1.6210 | 36.2 | $R_5$=−104. | $t_3$ = 4.3 |
| | | | $R_6$= +216.6 | $S_3$ VARIES 15.7−30.7 |
| 4 | 1.6230 | 56.9 | $R_7$=+1425. | $t_4$= 13.0 |
| | | | $R_8$=−107. | |

INVENTORS
ROGER H. APPELDORN
DAVID C. GILKESON
BY

*Carpenter, Kinney & Coulter*
ATTORNEYS

Dec. 12, 1967   R. H. APPELDORN ETAL   3,357,775
PROJECTION OBJECTIVE AFFORDING VARIABLE MAGNIFICATION
Original Filed Nov. 13, 1961   3 Sheets-Sheet 3

INVENTORS
ROGER H. APPELDORN
DAVID C. GILKESON
BY

*Carpenter, Kinney & Coulter*
ATTORNEYS

United States Patent Office 3,357,775
Patented Dec. 12, 1967

3,357,775
PROJECTION OBJECTIVE AFFORDING VARIABLE MAGNIFICATION
Roger H. Appeldorn, White Bear Lake, Minn., and David C. Gilkeson, Rochester, N.Y., assignors to Minnesota Mining and Manufacturing Company, St. Paul, Minn., a corporation of Delaware
Original application Nov. 13, 1961, Ser. No. 151,611. Divided and this application Oct. 24, 1965, Ser. No. 509,677
4 Claims. (Cl. 350—186)

This invention relates to an optic lens system and more particularly to a lens system or assembly for use in overhead projectors. It will be understood, however, that the lens system of the present invention may also be used in other optical equipment such as viewers and cameras where it is desirous to bend the optic path in a compact unit.

The overhead projectors of the prior art have conventionally employed an optic system including a three element projection lens and a flat mirror, the mirror being located either between the transparency and the lens, or between the lens and the screen. The flat mirror is used to bend the optic axis or path from a vertical to a horizontal orientation. As a result of the aforementioned arrangement the prior art machines are large and bulky.

The prior art devices aforementioned have the further disavantage that no really satisfactory focussing means is provided. Projectors having means for focussing, usually require the movement of the entire projection head vertically with respect to the stage or movement of the lens assembly vertically or horizontally with respect to the mirror, often resulting in vignetting and variation in screen illumination. Further, for a given screen area, there is only one distance at which the prior art projectors can be positioned with respect to the screen in order to match the projected image to the size of the screen. As a result, movement of the whole machine toward or away from the screen is necessary to locate that precise position required for the desired image size.

It is therefore, an object of the present invention to provide a projection lens assembly of unusually compact construction which is particularly well adapted for use in an overhead projector and which permits such projectors to be substantially smaller than known projectors capable of projecting transparencies of similar size.

The present invention has a further object to provide a lens assembly of the aforementioned character in which the focussing can be readily accomplished without substantial vertical shifting of the screen image and without vignetting or degrading the uniformity of screen illumination.

A further object of the present invention is to provide a lens system or assembly which when used in an overhead projector may be readily focused on a screen at any distance beyond, for example, 2.4 feet without moving the entire optical assembly vertically and without moving the entire machine toward or away from the screen.

These and other desirable objects will become more apparent upon perusal of the following description in conjunction with the accompanying drawing.

In the drawing:
FIGURE 1 is a diagrammatic view of one form of lens assembly constructed in accordance with the present invention;

FIGURE 2 is a diagrammatic view of another form of lens assembly constructed in accordance with the present invention;

Figure 5:
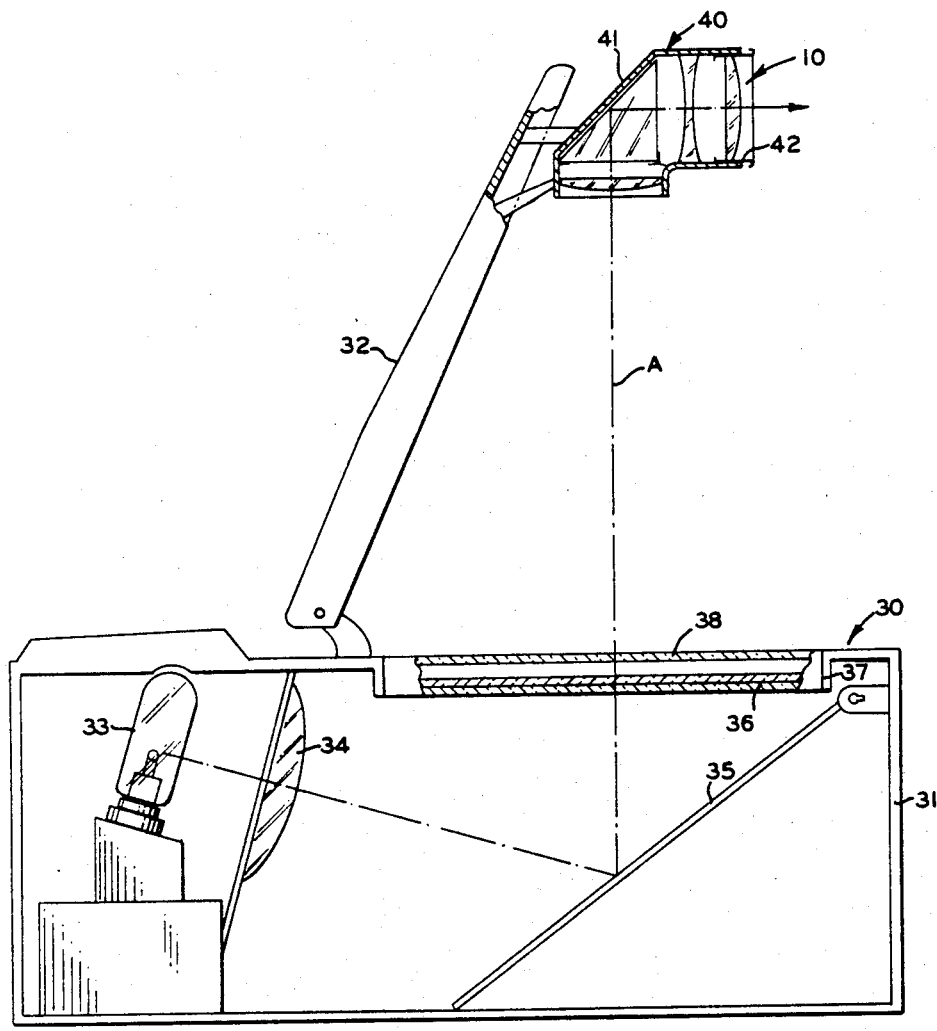
FIGURE 5 is a diagrammatic view of an overhead projector incorporating one embodiment of the invention.

The lens of the present invention finds particular advantage when incorporated in an overhead projector, for example, of the type illustrated in FIGURE 5. The overhead projector in FIGURE 5 generally designated by the numeral 30 comprises a box-like case 31 to which is suitably attached a top cover 32. Positioned in one end of the case 31 is a suitable light source 33, such as a lamp having an incandescent filament and preferably containing a reflector (not shown) to insure maximum utilization of all of the available light. Light rays from the source 33 pass through a condensing lens 34 and impinge upon a mirror 35 having a flat reflective surface. The light is reflected from the mirror 35 vertically upward through a pair of back-to-back Fresnel condensing lenses 36 and 37 and a flat piece of glass 38 forming a transparent stage at the upper surface of the case 31. The object to be projected is placed upon the stage 38 and as a result of the condensing lenses, the light and image of the object are directed upwardly in a cone of light which is intercepted by a series of lenses in a projection head 40 such that the apex of the cone of light is within the projection head 40. The projection head 40, as diagrammatically shown in FIGURE 5, includes a lens system 10 embodying the present invention and which will be discussed in more detail as this description proceeds. The head 40 comprises a rigid housing 41 suitably attached to the cover 32 and a telescoping barrel member 42 which movably supports one of the lenses of the aforementioned system 10. The barrel 42 may be telescoped into the housing 41 by means of a helical groove arrangement or other suitable means well known in the art to afford axial adjustment of the position of the lens supported therein for focussing of the projected image. The optic axis of the overhead projector is shown by the broken line A.

In the following description the expression "transparency" denotes the object to be projected, usually 10 inches by 10 inches in size but not necessarily limited to this size, and the expression "screen" denotes the receiving surface upon which the image is to be projected. This receiving surface may be a wall or screen. The "object distance" is the distance between the transparency and the lens, and the "image distance" is the distance between the lens and the screen. The lens elements are numbered consecutively from front to rear, the front being defined as the side of the lens which first receives incident radiation from the transparency and the rear being defined as the side of the lens closer to the screen.

The radii of curvature R, the axial thickness T of the lens elements, and the air spacing S between elements, are expressed in the customary manner, with the usual subscripts indicating a particular surface, thickness or air space, numbered in sequence from front to rear. The plus values of the radii R indicate surfaces convex to the incident radiation and the minus values of the radii R indicate surfaces concave to the incident radiation, in accordance with conventional notation, while a radius of infinity or $\infty$ indicates a plane surface. The respective refractive indices $N_D$ are expressed in reference to the spectral D lines, and the dispersive indices or Abbe numbers are indicated by $\nu$. The focal length of an individual lens element is indicated by $f$ with a corresponding subscript whereas F denotes the equivalent focal length of the lens system.

Figures 1, 3:
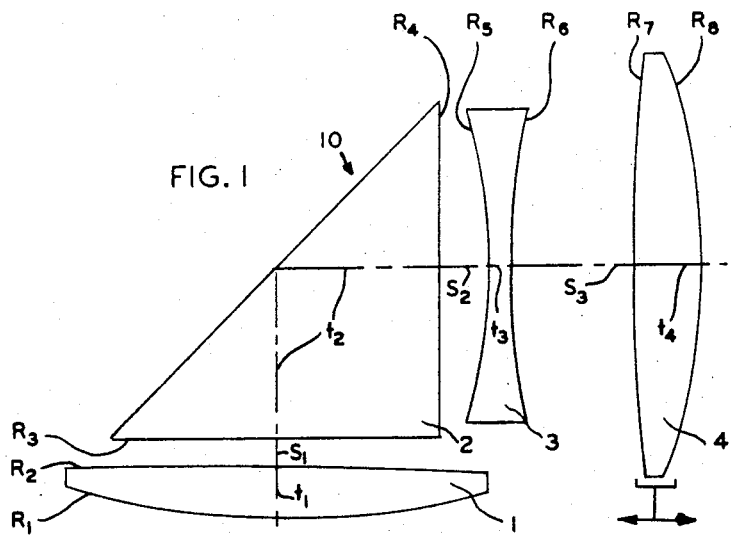
FIGURE 3 and 4 show in tabular form the optical values for the lenses ilustrated in FIGURES 1 and 2, respectively.

Referring now to FIGURE 1 of the drawing, the lens system 10 comprises a lens element 1 of the positive or converging type spaced a fixed distance $S_1$ from a right triangular prism 2 which is also a lens element but has a focal length of infinity. The prism 2 is integrated optically into the lens system and serves to bend the optic axis from a vertical to a horizontal orientation as shown in FIGURE 1. A negative or diverging lens element 3 is axially aligned with the horizontal optic axis and is spaced a distance $S_2$ from the adjacent prism surface. A positive or converging lens element 4 is axially aligned with lens element 3 and is provided with suitable mounting means (shown in FIGURE 5) rendering said element axially movable relative to lens element 3 to vary the spatial relationship $S_3$ therebetween. The aperture stop of the lens system 10 is positioned within the prism or near the rear surface $R_4$ of the prism. Axial movement of lens element 4 allows focussing of the projected image on a screen a reasonable distance from the projector without substantial movement of the aperture stop and without degradation of the intensity and uniformity of screen illumination as the image of the lamp filament remains inside the lens system 10 due to the relationship of the lens system 10 with the cone of light projected through the stage as aforementioned. Further, this arrangement permits the prism 2 to be of minimum size and it also makes most efficient use of the lens elements. The optic prism 2 may, if desired, have truncated corners to provide space conservation without any decrease in its effectiveness.

It has been found that the above-mentioned objects are obtained by the use of a lens system 10 in which the indicated variable factors lie numerically within the ranges set forth in Table 1 below, F being the equivalent focal length of the lens system when $S_3$ is 23.3 mm.

TABLE 1

$.58F < +f_1 < .73F$
$f_2 = \infty$
$.27F < -f_3 < .36F$
$.39F < +f_4 < .50F$
$.40F < +R_1 < .52F$
$2.80F < -R_2 < 3.82F$
$R_3 = \infty$
$R_4 = \infty$
$.25F < -R_5 < .33F$
$.54F < +R_6 < .68F$
$3.53F < +R_7 < 4.51F$
$.26F < -R_8 < .34F$ A specific example of lens system 10 whose variables fall within the above-mentioned limits and which meets all the outlined requirements is illustrated below in Table 2, the various symbols therein having the well known meanings explained above. When constructed in accordance with the numerical data of Table 2, the lens system has an equivalent focal length of 358 mm. at an air space $S_3$ of 23.3 mm. and has a relative aperture $f$:5.2.

TABLE 2

| Lens | $N_D$ | $\nu$ | Radii, mm. | Thicknesses and airspaces, mm. |
|---|---|---|---|---|
| 1 | 1.6203 | 60.3 | $R_1 = +165.25$ | $t_1 = 9.5$ |
|   |        |      | $R_2 = -1,166.0$ | $S_1 = 5.6$ |
| 2 | 1.5170 | 64.5 | $R_3 = \infty$ | $t_2 = 63.5$ |
|   |        |      | $R_4 = \infty$ | $S_2 = 10.0$ |
| 3 | 1.621  | 36.2 | $R_5 = -104.0$ | $t_3 = 4.3$ |
|   |        |      | $R_6 = +216.6$ | $S_3$ varies 15.7 to 30.7 |
| 4 | 1.6230 | 56.9 | $R_7 = +1,425.0$ | $t_4 = 13.0$ |
|   |        |      | $R_8 = -107.0$ |  |

In the use of this exemplary lens system of Table 2, the distance from the transparency to the horizontal optical axis is preferably held constant at 422.5 mm., and the focus at desired image distances may be obtained by axially moving the lens element 4. The variations in image distance and magnification as functions of the various values of $S_3$ are stated below in Table 3.

It is to be understood, however, that the air space $S_3$ may have any value between 15.7 and 30.7 mm. and not just the values given in the table below.

TABLE 3

| $S_3$ (mm.) | Image distance (feet) | Magnification |
|---|---|---|
| 30.7 | 4.5 | 3.2× |
| 23.2 | 6.8 | 5.0× |
| 15.7 | 15.0 | 11.4× |

A projection lens of the type defined by Tables 1 to 3 finds its greatest utility in projectors for presenting information to an audience under conditions wherein an exceptionally large image is not required.

A modification of the present invention is shown in FIGURE 2 wherein a lens system 10' comprises six lens elements which are mounted in a suitable housing (not shown) incorporating said elements into a unitary projection head. A positive biconvex lens element 11 is disposed on the front or object end of the system and is airspaced a vertical distance $S_{11}$ from a negative biconcave lens element 12. The lens elements 11 and 12 are axially aligned and element 11 is suitably mounted for vertical movement axially with respect to element 12 to vary the spacing $S_{11}$ and thereby the focal length of the system. A right angle prism 13 is spaced a distance $S_{12}$ from the lens element 12, and is integrated into the system in a manner to bend the optic path for example from the vertical to the horizontal orientation shown. For convenience the aforementioned lens elements, 12 and 13 are referred to hereinafter as the front member or group of the lens assembly. A positive biconvex lens element 14 is spaced rearwardly from the right angle lens 13 a horizontal distance $S_{13}$, and horizontally spaced a distance $S_{14}$ from element 14 is an axially aligned positive biconvex lens element 15. A negative biconcave lens element 16 is axially aligned with the element 15 and is spaced rearwardly therefrom a distance $S_{15}$. The element 16 is suitably mounted for movement along the horizontal axis toward and away from the element 15. Lens elements 14, 15 and 16 are referred to hereinafter as comprising the rear group of the lens assembly. The aperture stop of the lens system 10' is located within or near the prism 13 permitting the prism to be of a minimum size as in the case of the lens system 10.

Vertical adjustment of the lens 11 varies the magnification provided by the improved lens system 10', permitting the size of the projected image to be changed to match the screen size at a given image distance. Such matching can thus be accomplished without movement of the entire projector to a precise position and further, without vertical movement of the entire projection head 40 in which the lens 11 is mounted. Once the selected magnification has been obtained by adjustment of the lens 11, adjustment of the lens element 16 affords proper focussing of the image on the screen.

It is found that excellent results are obtained with the lens system 10' in which the indicated variable factors lie numerically within the ranges set forth in Table 4 below, F being the equivalent focal length of the lens system when $S_{11}$ is 21 mm. and $S_{15}$ is 9 mm.

TABLE 4

$.37F < +f_{11} < .48F$
$.29F < -f_{12} < .38F$
$f_{13} = \infty$
$.85F < +f_{14} < 1.12F$
$.40F < +f_{15} < .51F$
$.37F < -f_{16} < .48F$ $.26 < \dfrac{f_{11}}{f_{14}+f_{15}} < .34$ $.24 < \dfrac{-f_{16}}{f_{14}+f_{15}} < .36$ $.21F < +R_{11} < .29F$
$1.30F < -R_{12} < 1.62F$
$.37F < -R_{13} < .47F$
$.37F < +R_{14} < .47F$
$R_{15} = \infty$
$R_{16} = \infty$
$1.50F < +R_{17} < 1.87F$
$.62F < -R_{18} < .78F$
$.61F < +R_{19} < .76F$
$.30F < -R_{20} < .40F$
$.24F < -R_{21} < .31F$
$.97F < +R_{22} < 1.24F$ A specific example of lens system 10' whose variables fall within the limits set forth above in Table 4 is one which has an equivalent focal length variable from 254.8 mm. to 357.1 mm. and a relative aperture $f:5.2$, and which is constructed in accordance with the numerical data appearing in Table 5 below, the various symbols therein being well known to those skilled in the art.

TABLE 5

| Lens | $N_D$ | $\nu$ | Radii, mm. | Thicknesses and airspaces, mm. |
|---|---|---|---|---|
| 11 | 1.5170 | 64.5 | $R_{11}=+78.43$ | $t_{11}=14.5$ |
|  |  |  | $R_{12}=-443.8$ | $S_{11}$ varies 7 to 40 |
| 12 | 1.6210 | 36.2 | $R_{13}=-128.5$ | $t_{12}=3.5$ |
|  |  |  | $R_{14}=+128.5$ | $S_{12}=6.5$ |
| 13 | 1.5170 | 64.5 | $R_{15}=\infty$ | $t_{13}=63.5$ |
|  |  |  | $R_{16}=\infty$ | $S_{13}=4.0$ |
| 14 | 1.5230 | 58.6 | $R_{17}=+512$ | $t_{14}=7.0$ |
|  |  |  | $R_{18}=-214.6$ | $S_{14}=0.5$ |
| 15 | 1.5230 | 58.6 | $R_{19}=+208.4$ | $t_{15}=15.0$ |
|  |  |  | $R_{20}=-107$ | $S_{15}$ varies 4 to 14 |
| 16 | 1.5170 | 64.5 | $R_{21}=-83.3$ | $t_{16}=4.0$ |
|  |  |  | $R_{22}=+334.4$ |  |

The projection lens system 10', like the lens system 10, has its aperture stop positioned within or near the right angle prism thereof and in the use of the exemplary lens system 10' of Table 5 in an overhead projector the horizontal optic path is preferably 442.2 mm. above the transparency.

The focal length may be changed by moving the lens element 11 vertically to vary the air space $S_{11}$. To focus the system at desired image distance, lens element 16 is moved horizontally to vary the airspace $S_{15}$. For the exemplary lens system 10' of Table 5 the change in image distance and magnification as functions of various values of $S_{15}$, for three different values of equivalent focal length, appear below in Table 6.

TABLE 6

| Equivalent focal length (mm.) | $S_{11}$ (mm.) | $S_{15}$ (mm.) | Image distance (feet) | Magnification |
|---|---|---|---|---|
| 254.8 | 40 | 14 | 2.4 | 2.7× |
|  |  | 9 | 3.4 | 3.6× |
|  |  | 4 | 5.5 | 5.6× |
| 305.1 | 21 | 14 | 3.5 | 3.3× |
|  |  | 9 | 5.7 | 5.1× |
|  |  | 4 | 13.9 | 11.9× |
| 357.1 | 7 | 14 | 5.0 | 4.1× |
|  |  | 9 | 10.6 | 8.2× |
|  |  | 4 | ∞ | Infinite |

It will be understood that the valves of $S_{11}$ and $S_{15}$ may vary anywhere between the upper and lower limits stated in the above table.

Figure 4:
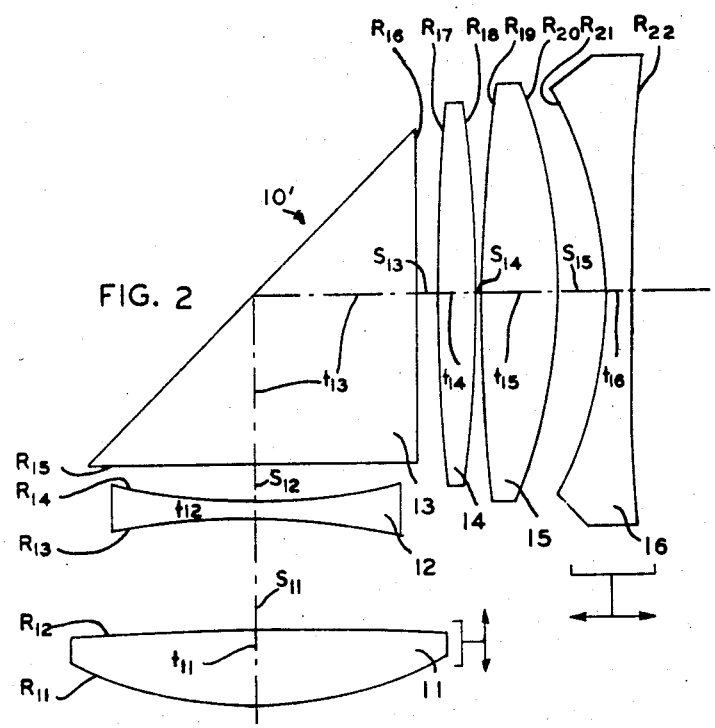

The numerical data from Tables 2 and 5 is repeated for convenience in FIGURES 2 and 4 of the drawing.

It will be appreciated that projection lens system 10' is very versatile. Because of the focal length change accomplished by moving lens 11 of the front group up or down, as shown in FIGURE 2, the lens may be used at image distances of from 2.4 feet to very great distances. Also, the range of image distances and magnifications at the short focal length position overlap those at the long focal length position and make this embodiment more versatile than the first embodiment, allowing its use with an audience of any size.

The use of either of the lens systems 10 or 10' in an overhead projector of the type shown in FIGURE 5 has a number of advantages over previously known overhead projectors. The improved projection system utilizing an integrated prism as the light bending means lends a high degree of compactness permitting the head 40 to be of substantially smaller size than known projection head assemblies. The head 40 is of rugged construction and the area of the glass exposed to the elements tending to cause scratches to appear thereon is greatly reduced. Additionally, the improved lens construction permits the projection head 40 to be positioned a greater distance above the stage. This greater distance, together with the aforementioned compactness, makes the stage more accessible to the operator, allowing more freedom of movement than previously known constructions in which bulky heads are positioned close to the stage. Additionally, this compact head assembly does not obstruct the view of the screen like the bulky heads of previously known overhead projectors. The versatility of the improved lens construction and the fact that the image may be focussed at any reasonable distance from the screen without decreasing the intensity or uniformity of screen illumination overcomes many of the annoying inconveniences presented by existing constructions.

Although only preferred embodiments of the invention have been shown and described, it will be understood that various changes and modifications may be made without departing from the spirit of the invention. For example, the relative aperture value of the lens systems 10 and 10' is not limited to the given value of $f:5.2$, but may be of any suitable or desired value. Further, the prisms of the lens systems 10 and 10' need not be 45° right angle prisms, but may vary to produce the optical deflection desired. All such changes and modifications are contemplated as may come within the scope of the appended claims.

What is claimed as the invention is:

1. A lens system consisting essentially of six air spaced lens elements, one of said elements being a triangular prism integrated in said system and positioned between other of said elements for changing the direction of the optic axis of the lens system, the other five of said elements being optically aligned along said optic axis from front to rear, the first of said five elements being a biconvex lens, the second being a biconcave lens positioned adjacent said first element and adjacent one side of the prism, the third being a biconvex lens positioned adjacent another side of said prism, the fourth being a biconvex lens, the fifth being a biconcave lens, and said first and fifth of said other five elements being movable along the optic axis for changing the magnification value and the equivalent focal length of the lens system and for focusing.

2. A lens system comprising air spaced lens elements, one of said elements being a triangular prism integrated in said system and positioned between other of said elements for changing the direction of the optic axis of the lens system, the other five of said elements being optically aligned along said optic axis from front to rear, the first of said five elements being a positive lens, the second being a negative lens positioned adjacent said first element and adjacent one side of the prism, the third being a positive lens positioned adjacent another side of said prism, the fourth being a positive lens, and the fifth being a negative lens, and wherein the characteristics of the lens elements and their spatial relationship are substantially as in the following table:

| Lens | $N_D$ | $\nu$ | Radii, mm. | Thicknesses and airspaces, mm. |
|---|---|---|---|---|
| 11 | 1.5170 | 64.5 | $R_{11}=+78.48$ | $t_{11}=14.5$ |
|    |        |      | $R_{12}=-443.8$ | $S_{11}$ varies 7 to 40 |
| 12 | 1.6210 | 36.2 | $R_{13}=-128.5$ | $t_{12}=3.5$ |
|    |        |      | $R_{14}=+128.5$ | $S_{12}=6.5$ |
| 13 | 1.5170 | 64.5 | $R_{15}=\infty$ | $t_{13}=63.5$ |
|    |        |      | $R_{16}=\infty$ | $S_{13}=4.0$ |
| 14 | 1.5230 | 58.6 | $R_{17}=+512$ | $t_{14}=7.0$ |
|    |        |      | $R_{18}=-214.6$ | $S_{14}=0.5$ |
| 15 | 1.5230 | 58.6 | $R_{19}=+208.4$ | $t_{15}=15.0$ |
|    |        |      | $R_{20}=-107$ | $S_{15}$ varies 4 to 14 |
| 16 | 1.5170 | 64.5 | $R_{21}=-83.3$ | $t_{16}=4.0$ |
|    |        |      | $R_{22}=+334.4$ |  | wherein the respective lens elements are numbered from the front toward the rear in the first column, the corresponding refractive indices N for the D line of the spectrum are given in the second column, the corresponding dispersive indices $\nu$ are given in the third column, the radii of curvature R of the lens surfaces are given in the fourth column, the respective surfaces being numbered in sequence in the same order as the lens elements and being respectively identified by the subscript numeral used with each R, plus and minus values of R indicating surfaces which are respectively convex and concave to radiation entering the front of the lens system at lens (11); the axial thicknesses $t$ of the respective lens elements and the air spaces S between lens elements being given in the fifth column, the respective lens element thicknesses $t$ of the lens elements and air spaces S between lens elements being identified by subscripts numbered in sequence in the same order as the lens elements; and the quantities R, $t$ and S being expressed in millimeters for a lens system having an equivalent focal length varying between 254.8 and 357.1 millimeters, which quantities vary proportionately for lens systems having other equivalent focal lengths.

3. A lens system comprising six air spaced lens elements, one of said elements being a triangular prism integrated in said system and positioned between other of said elements for changing the direction of the optic axis of the lens system, the other five of said elements being optically aligned along the optic axis from front to rear, the first of said five elements being a positive lens, the second being a negative lens positioned adjacent said first element and adjacent one side of the prism, the third being a positive lens positioned adjacent another side of said prism, the fourth being a positive lens, and the fifth being a negative lens, and wherein said lens elements have the following numerical characteristics:

$$.37F<+f_{11}<.48F$$
$$.29F<-f_{12}<.38F$$
$$f_{13}=\infty$$
$$.85F<+f_{14}<1.12F$$
$$.40F<+f_{15}<.51F$$
$$.37F<-f_{16}<.48F$$

$$.26<\frac{f_{11}}{f_{14}+f_{15}}<.34$$

$$.24<\frac{-f_{16}}{f_{14}+f_{15}}<.36$$

$$.21F<+R_{11}<.29F$$
$$1.30F<-R_{12}<1.62F$$
$$.37F<-R_{13}<.47F$$
$$.37F<+R_{14}<.47F$$
$$R_{15}=\infty$$
$$R_{16}=\infty$$
$$1.50F<+R_{17}<1.87F$$
$$.62F<-R_{18}<.78F$$
$$.61F<+R_{19}<.76F$$
$$.30F<-R_{20}<.40F$$
$$.24F<-R_{21}<.31F$$
$$.97F<+R_{22}<1.24F$$

wherein F is the equivalent focal length of said lens system, $f$ with a subscript denotes the focal length of an individual lens element as numbered from the front toward the rear, R is the radius of curvature of a lens surface, the subscript numeral identifying the particular surface numbered in sequence from the front toward the rear, plus and minus values of R indicating surfaces which are respectively convex and concave to radiation entering the lens system at said front element.

4. A lens system comprising six air spaced lens elements, one of said elements being a triangular prism integrated in said system and positioned between other of said elements for changing the direction of the optic axis of the lens system, the other five of said elements being optically aligned along said optic axis from front to rear, the first of said five elements being a positive lens, the second being a negative lens positioned adjacent said first element and adjacent one side of the prism, the third being a positive lens positioned adjacent another side of said prism, the fourth being a positive lens, the fifth being a negative lens, and said first and fifth of said other five elements being movable along the optic axis for changing the magnification value and the equivalent focal length of the lens system and for focusing.

References Cited
UNITED STATES PATENTS

| | | | |
|---|---|---|---|
| 1,145,132 | 7/1915 | Florian | 88—57 |
| 2,846,922 | 8/1958 | Kohler | 88—57 |
| 2,989,895 | 6/1961 | Sandback | 88—57 |

JEWELL H. PEDERSEN, *Primary Examiner.*

R. J. STERN, *Assistant Examiner.*

UNITED STATES PATENT OFFICE
CERTIFICATE OF CORRECTION

Patent No. 3,357,775        Dated December 12, 1967

Inventor(s) Roger H. Appeldorn and David C. Gilkeson

It is certified that error appears in the above-identified patent and that said Letters Patent are hereby corrected as shown below:

Column 1, line 70, "Figure" should be -- Figures --.

Column 8, line 14, ".21E" should be -- .21F --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents